United States Patent
Qi et al.

(10) Patent No.: US 11,573,840 B2
(45) Date of Patent: *Feb. 7, 2023

(54) MONITORING AND OPTIMIZING INTERHOST NETWORK TRAFFIC

(71) Applicant: Nicira, Inc., Palo Alto, CA (US)

(72) Inventors: Xin Qi, Redmond, WA (US); Fenil Kavathia, Sunnyvale, CA (US); Chidambareswaran Raman, Sunnyvale, CA (US); Shadab Shah, Sunnyvale, CA (US); Raju Koganty, San Jose, CA (US); Jingmin Zhou, Los Gatos, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/935,179

(22) Filed: Jul. 21, 2020

(65) Prior Publication Data

US 2020/0348983 A1 Nov. 5, 2020

Related U.S. Application Data

(63) Continuation of application No. 15/796,245, filed on Oct. 27, 2017, now Pat. No. 10,725,833.

(Continued)

(51) Int. Cl.
*G06F 15/173* (2006.01)
*G06F 9/50* (2006.01)
(Continued)

(52) U.S. Cl.
CPC ........ *G06F 9/5077* (2013.01); *G06F 9/45558* (2013.01); *G06F 9/505* (2013.01); *H04L 41/0893* (2013.01); *H04L 41/0896* (2013.01); *H04L 41/12* (2013.01); *H04L 43/026* (2013.01); *H04L 43/0876* (2013.01); *H04L 43/16* (2013.01); *G06F 2009/4557* (2013.01); *H04L 43/065* (2013.01)

(58) Field of Classification Search
CPC . H04L 12/6418; H04L 67/10; H04L 67/1002; G06F 9/5088; G06F 9/45558; G06F 9/4856
See application file for complete search history.

(56) References Cited

U.S. PATENT DOCUMENTS 8,527,988 B1 9/2013 Rhine
10,374,866 B1 8/2019 Berg et al.
(Continued)

*Primary Examiner* — Dustin Nguyen
(74) *Attorney, Agent, or Firm* — Adeli LLP

(57) ABSTRACT

Some embodiments provide a method for clustering a set of data compute nodes (DCNs), which communicate with each other more frequently, on one or more host machines. The method groups together guest DCNs (GDCNs) that (1) execute on different host machines and (2) exchange network data among themselves more frequently, in order to reduce interhost network traffic. The more frequently-communicating GDCNs can be a set of GDCNs that implement a distributed application, GDCNs of a particular tier in a multi-tier network architecture (e.g., a web tier in a three-tier architecture), GDCNs that are dedicated to a particular tenant in a hosting system, or any other set of GDCNs that exchange data among each other regularly for a particular purpose.

18 Claims, 8 Drawing Sheets

Related U.S. Application Data

(60) Provisional application No. 62/414,430, filed on Oct. 28, 2016.

(51) Int. Cl.

| | | |
|---|---|---|
| *H04L 43/0876* | (2022.01) |
| *H04L 43/16* | (2022.01) |
| *G06F 9/455* | (2018.01) |
| *H04L 43/026* | (2022.01) |
| *H04L 41/0893* | (2022.01) |
| *H04L 41/12* | (2022.01) |
| *H04L 41/0896* | (2022.01) |
| *H04L 43/065* | (2022.01) |

(56) References Cited

U.S. PATENT DOCUMENTS

| | | | |
|---|---|---|---|
| 2009/0013407 A1 | 1/2009 | Doctor et al. | |
| 2011/0131570 A1* | 6/2011 | Heim | G06F 9/45558 718/1 |
| 2012/0011254 A1 | 1/2012 | Jamjoom et al. | |
| 2012/0096134 A1* | 4/2012 | Suit | H04L 12/6418 709/221 |
| 2013/0081013 A1 | 3/2013 | Plondke et al. | |
| 2013/0198355 A1* | 8/2013 | Kalyanaraman | G06F 9/4856 709/223 |
| 2013/0304899 A1 | 11/2013 | Winkler | |
| 2014/0033220 A1 | 1/2014 | Campbell et al. | |
| 2014/0254388 A1 | 9/2014 | Kumar et al. | |
| 2014/0280547 A1* | 9/2014 | DeCusatis | H04L 67/10 709/204 |
| 2015/0163142 A1 | 6/2015 | Pettit et al. | |
| 2016/0094477 A1 | 3/2016 | Bai et al. | |
| 2016/0103699 A1 | 4/2016 | Thakkar et al. | |
| 2017/0054654 A1 | 2/2017 | Garg et al. | |
| 2017/0199770 A1* | 7/2017 | Peteva | G06F 9/5088 |
| 2017/0250889 A1 | 8/2017 | Vogt et al. | |
| 2017/0279884 A1* | 9/2017 | Yang | H04L 67/1002 |
| 2018/0095776 A1 | 4/2018 | Tsai et al. | |
| 2018/0121250 A1 | 5/2018 | Qi et al. | |
| 2018/0206110 A1 | 7/2018 | Chaki et al. | |
| 2019/0286469 A1* | 9/2019 | Lakshmikantha | G06F 9/45558 |

\* cited by examiner

MONITORING AND OPTIMIZING INTERHOST NETWORK TRAFFIC

CLAIM OF BENEFIT TO PRIOR APPLICATIONS

This application is a continuation application of U.S. patent application Ser. No. 15/796,245, filed Oct. 27, 2017, now published as U.S. Patent Publication 2018/0121250. U.S. patent application Ser. No. 15/796,245 claims the benefit of U.S. Provisional Patent Application 62/414,430, filed Oct. 28, 2016. U.S. patent application Ser. No. 15/796,245, now published as U.S. Patent Publication 2018/0121250, is incorporated herein by reference.

BACKGROUND

Software-Defined Networking (SDN) is an evolving networking paradigm. A logical overlay network that is implemented over a physical network infrastructure (e.g., of an enterprise datacenter or a hosting system) is a good example of SDN. A logical network, logically connects different virtual machines (e.g., of a tenant of a hosting system), which run on one or more host machines, to each other and to other external networks (i.e., other physical and/or logical networks). Between the virtual machines (VMs) of a common host, network data is transmitted within the host machine (i.e., does not pass through physical cables and switches that connect the host machines). This type of traffic is called intrahost network traffic. On the other hand, the network traffic communicated between VMs of different hosts, which is called interhost traffic, is transmitted through at least some of the physical switches and cables of the physical network. Since intrahost traffic uses only the computing sources of a host machine (and not the physical network), intrahost traffic is highly preferable over interhost traffic in datacenters and hosting systems.

Additionally, a widespread VM placement within a hosting system (e.g., VMs that implement a particular application) increases the probability of co-residence threats (i.e., when an attacker VM and a victim VM operate on the same host machine). In order to reduce interhost traffic, high-end switches with large bandwidth capacities that can generate a high volume of interhost bandwidth have been introduced to the market. However, these high-end switches are not cost-effective. Moreover, using high-end switches limits the throughput of computing tasks in datacenters.

BRIEF SUMMARY

Some embodiments provide a method for clustering a particular set of data compute nodes (DCNs) on a single host machine. In some embodiments, the particular set of DCNs includes two or more guest DCNs (GDCNs) that (1) execute on different host machines and (2) exchange network data with each other frequently. The method of some embodiments groups the frequently-communicating GDCNs together to operate on a common host machine in order to minimize the interhost network communications. In some embodiments, when the number of GDCNs that have to be clustered together exceeds a threshold, the method divides the cluster into two or more sub-clusters that are placed on different host machines (e.g., through a load balancing technique). In some embodiments, the different host machines are host servers that operate on a same rack of servers.

A GDCN, in some embodiments, is an end machine (e.g., a virtual machine, a container, a namespace, etc.) that operates in a logical network (e.g., a logical network assigned to a tenant of a multi-tenant hosting system). The GDCN executes on a host machine and communicates with other GDCNs of the logical network executing on the same host machine and/or other host machines. A cluster of frequently-communicating GDCNs may include all of the GDCNs of a particular logical network, a set of GDCNs that implement a distributed application, GDCNs of a particular tier in a multi-tier network architecture (e.g., a web tier in a three-tier architecture), or any other set of GDCNs that exchange data among each other on a regular basis for a particular purpose.

Some embodiments provide a service DCN (SDCN) in each host machine for collecting network data that is originated (or received) by the GDCNs of the same host machine. A collection agent in each GDCN intercepts the data messages (e.g., originated by different applications that run on the GDCN) and sends a duplicate of each data message (or redirects the original data message) to a SDCN that operates on the same host machine as the GDCN. In some embodiments, while the original data message is sent towards its final destination, a collection agent intercepts the data message, generates a copy of the data message, and sends the copy to a SDCN. In some other embodiments, the collection agent intercepts the original data message and redirects the same data message to the SDCN. In some such embodiments, the SDCN (after reading the metadata carried by the data message) may send the data message towards its original destination.

In some embodiments, the collection agent operates in the kernel space (of a virtualization software of the host machine) between a virtual network interface controller (VNIC) of a GDCN and a port of a forwarding element (e.g., a managed software switch) to which, the GDCN is coupled. For example, in some embodiments, the collection agent operates on a VNIC of a GDCN and sends duplicates of the data messages received at the VNIC to a SDCN. In some other embodiments, the collection agent operates on a port of a managed switch to which the GDCN is coupled and sends the duplicates of the GDCN's data messages to a SDCN from the switch's port.

Based on the metadata stored in the data messages a SDCN receives from the different collection agents of different GDCNs, the SDCN can recognize which GDCNs communicate with each other more frequently. For example, based on the source and destination addresses of the different packets, the SDCN of each host machine identifies the source and destination nodes that exchange network data with each other more often. In some embodiments another server machine receives the metadata statistics stored in the different SDCNs of the different host machines and identifies the frequently-communicating GDCNs.

In some embodiments, a service DCN is a third-party security appliance (e.g., a third-party service VM) that operates on a host machine and provides third-party security services (e.g., antivirus/antimalware services, vulnerability management services, etc.). In some such embodiments, when a third-party service appliance is activated (instantiated) on a host machine, data messages (e.g., packets) that are received and/or sent by other VMs operating on the same host machine might go through this security appliance for a security check. Instead of, or in conjunction with a third-party security appliance, some embodiments provide a dedicated SDCN in each host machine that operates on the host machine to monitor network traffic sent from and/or to the GDCNs of the host machine. In yet other embodiments, one of the GDCNs might also provide this monitoring service.

A packet monitoring module operating in the kernel space of the host machine receives the data messages from the collection agents of the GDCNs and determines whether the data messages' metadata must be saved or not. In some embodiments, the packet monitoring module operates in the kernel space of a SDCN executing on the host machine. In some embodiments, the packet monitoring module sends the initial packet of each data flow to a separate module (e.g., a user space module) to make such determination (i.e., whether the packet's metadata should be stored).

In some such embodiments, when the second module determines that the initial packet's information must be stored, the packet monitoring module stores the metadata of each subsequent packet of the flow without sending the packets to the second module. In some other embodiments, the packet monitoring module decides on whether to store packets' metadata or not itself and without consulting any other module (even if the packet is the first packet of a data flow).

In some embodiments the packet monitoring module and collection agent are the same. That is, the separate functions that are described above and below for these modules are performed by a single agent/module in some embodiments. In some embodiments, this single module can be activated (or configured) to operate on each port of a managed forwarding element that is coupled to a DCN in order to intercept the packets received from, or sent to the DCN. In some other embodiments, this module is activated (or configured) to operate on the VNIC of each DCN.

In some embodiments, the packet monitoring module receives the metadata from different packet headers of each packet and stores the received metadata in a local data storage (e.g., in a user space of the SDCN). That is, each time a packet is received at the SDCN, an in-kernel callback function is triggered, with the received packet as a parameter. The triggered callback function then extracts packet level metadata and stores the extracted metadata in a local database of the SDCN.

The received metadata includes metadata stored in different headers of the packet such as source and destination internet protocol (IP) addresses, timestamp, packet length, etc. In some embodiments, in addition to storing the metadata, a SDCN also calculates and stores statistical information about the data exchanges between the GDCNs. For example, the SDCN calculates the total number of packets exchanged between each pair of GDCNs based on the collected metadata.

The SDCNs of different host machines, in some embodiments, provide the stored network traffic information to a central server (e.g., a controller of the network or a separate server communicating with a controller) for the central server to determine which GDCNs should be clustered (grouped) together. In some embodiments, a service daemon operating in the user space of each SDCN provides this information to a central controller upon occurrence of a certain event. For example, in some embodiments, the SDCNs provide the information upon receiving a request from the controller, while in other embodiments, the SDCNs deliver the information periodically and at certain time intervals. In yet other embodiments, the SDCNs deliver the inter-DCN traffic data to the controller upon occurrence of other triggering events. For example, when the number of packets exchanged between a group of GDCNs exceeds a threshold, some embodiments distribute the information to a controller to cluster the GDCNs together.

In some embodiments, a user (e.g., a datacenter network administrator, a tenant of a hosting system, etc.) defines the amount of data exchange that establishes a frequent communication between a pair of GDCNs. For example, the user may specify that when the number of packets exchanged between two GDCNs exceeds a threshold, the GDCNs should be considered as frequently-communicating GDCNs and as such, should be clustered together. In other embodiments, the user may specify a threshold amount of data exchanged (e.g., in bytes, rather than packets), or a threshold for the rate at which packets (or bytes of data) are exchanged, for GDCNs to be considered frequently-communicating for clustering purposes. The user may also define one or more clustering algorithms that should be used to group the frequently-communicating GDCNs together. In some embodiments, the user defines the communication frequency policy and clustering algorithms through a set of application programming interface (API) calls to a management and control system of the network.

The management and control system of some embodiments utilizes the received statistical information as input for the hierarchical clustering algorithms defined for the system to group different sets of frequently-communicating GDCNs in different clusters. The management and control system (e.g., one or more controllers in the management and controller system), after identifying the different groups, directs one or more migration modules operating on the host machines to move the GDCNs of each cluster to a particular host machine in order to optimize inter-host network communications. Some embodiments load balance the GDCNs that are to be distributed among the host machines if the numbers of GDCNs in different groups are not balanced. For example, when the number of guest VMs that are to be moved to a first host machine is considered to cause the host machine to be overloaded, some embodiments move a portion of the VMs to a second host machine. In some such embodiments, the extra VMs, however, are migrated to a host machine that operates on the same rack as the first host machine (in order to minimize inter-rack data communications).

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

Figure 1:
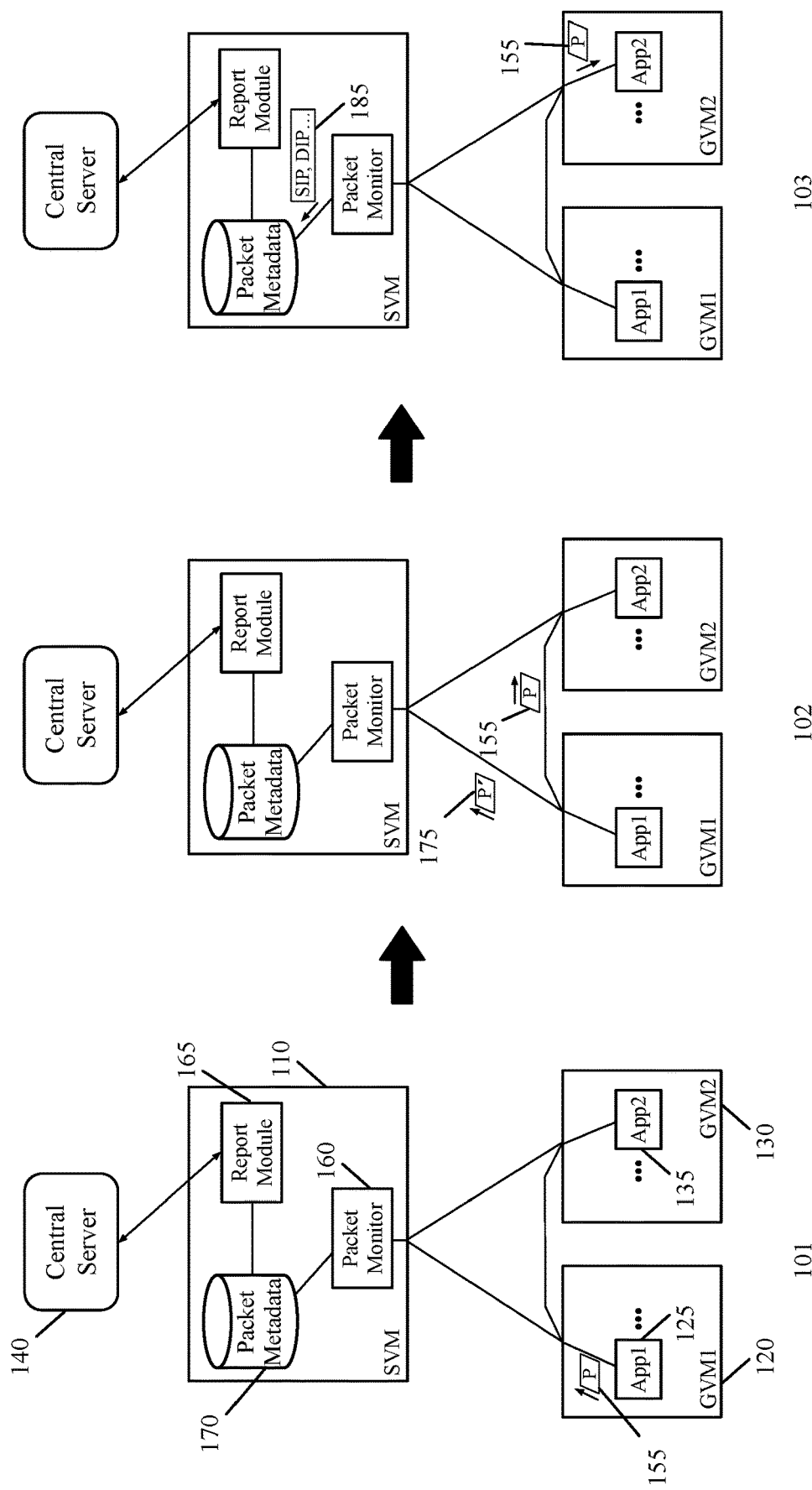
FIG. 1 illustrates a service virtual machine (VM) that receives copies of packets initiated and sent by a first guest (GVM) to a second GVM, and distributes a set of collected data from the received packets to a central server.

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a method for clustering a particular set of data compute nodes (DCNs) on a single host machine. In some embodiments, the particular set of DCNs includes two or more guest DCNs (GDCNs) that (1) execute on different host machines and (2) exchange network data with each other frequently. The method of some embodiments groups the frequently-communicating GDCNs together to operate on a common host machine in order to minimize the interhost network communications. In some embodiments, when the number of GDCNs that have to be clustered together exceeds a threshold, the method divides the cluster into two or more sub-clusters that are placed on different host machines (e.g., through a load balancing technique). In some embodiments, the different host machines are host servers that operate on a same rack of servers.

A GDCN, in some embodiments, is an end machine (e.g., a virtual machine, a container, a namespace, etc.) that operates in a logical network (e.g., a logical network assigned to a tenant of a multi-tenant hosting system). The GDCN executes on a host machine and communicates with other GDCNs of the logical network executing on the same host machine and/or other host machines. A cluster of frequently-communicating GDCNs may include all of the GDCNs of a particular logical network, a set of GDCNs that implement a distributed application, GDCNs of a particular tier in a multi-tier network architecture (e.g., a web tier in a three-tier architecture), or any other set of GDCNs that exchange data among each other more often for a particular purpose.

Some embodiments provide a service DCN (SDCN) in each host machine for collecting network data that is originated (or received) by the GDCNs of the same host machine. The SDCNs of different host machines, in some embodiments, provide the collected network traffic information to a central server (e.g., a controller of the network) for the central server to determine which GDCNs should be clustered (grouped) together. Before, distributing the collected data, each SDCN stores this data in a local data storage of the SDCN.

Based on the metadata stored in the data messages, the SDCN (or the central server) can recognize which GDCNs communicate with each other more frequently. For example, based on the source and destination addresses of the different packets, the SDCN of a host machine determines (and stores) the number of data packets that is exchanged between a source node and a destination node.

In some embodiments, a service daemon of a SDCN (e.g., operating in the user space of the SDCN) provides this information to a central controller upon occurrence of a certain event. For example, in some embodiments, the SDCNs provide the information upon receiving a request from the controller, while in other embodiments, the SDCNs deliver the information periodically and at certain time intervals. Yet, in some other embodiments, the SDCNs deliver the inter-DCN traffic data to the controller upon occurrence of other triggering events. For example, when the number of data messages exchanged between a group of GDCNs exceeds a threshold, some embodiments distribute the information to a controller to cluster the GDCNs together.

FIG. 1 illustrates a service virtual machine (VM) that receives copies of packets initiated and sent by a first guest VM (GVM) to a second GVM, and distributes a set of collected data from the received packets to a central server. More specifically, this figure shows, through three operational stages 101-103, how a service VM (SVM) receives a copy of a packet generated by a first GVM, collects identification data from the received packet, and sends the collected data to a central server (e.g., a controller or manager in the management and control system of the network) that manages the received collected data.

FIG. 1 includes an SVM 110, two GVMs 120 and 130, and a central server 140. Application 125 is executing on the GVM 120, while application 135 is executing on the GVM 130. In some embodiments, each GVM has a virtual network controller interface (VNIC) attached to the GVM which performs forwarding processing for the corresponding GVM (not shown in this figure). SVM 110 includes a packet monitoring module 160, a reporting module 165, and a packet metadata storage 170. As described above and below, in some embodiments, the packet monitoring module 160 operates in a kernel space of a host machine on which the SVM operates, while in other embodiments this module is part of the SVM 110. The reporting module 165 and packet metadata storage 170 operate in a user space of the SVM (e.g., a user space of the host machine on which the SVM executes) in some embodiments.

The first stage 101 of FIG. 1 shows that application 125 executing on GVM 120 has generated a packet 155 to be sent to application 135 executing on GVM 130. As shown, the packet 155 is heading towards GVM 130 to be forwarded towards its final destination (i.e., application 135). The two applications 125 and 135 might be two different instances of a distributed application that is implemented on multiple VMs. The second stage 102 illustrates that, the packet 155, on its path towards GVM 130, is duplicated and a duplicate 175 of the packet is sent to the SVM 110. The duplicate packet 175, as will be described in great detail below, might be generated at a software switch port of a managed forwarding element, to which, the GVM 120 is coupled. Conversely, the duplicate packet 175 could be generated at a VNIC of the GVM 120.

In some embodiments, an agent (e.g., a filter) operating on a VNIC (or a software switch port) is responsible for generating a duplicate for each packet received at the VNIC and forwarding the generated copy to a SVM that executes on the same host machine as the GVM associated with the VNIC. In some other embodiments, the filter does not make a duplicate packet for each received packet. Instead, in some such embodiments, the filter redirects the received packet to a corresponding SVM. The SVM, after receiving the packet, decides whether to forward the packet towards its original destination, drop the packet, or redirects the packet to a new destination.

The packets that are received and duplicated (or redirected) at the VNIC include packets that are sent by the applications running on the associated VM to other applications running on other VMs in some embodiments. The duplicated packets can also be packets that are sent by other VMs to the VM that is associated with the VNIC in some other embodiments. In some embodiments, the packets that are duplicated at the VNIC (or a port of a software switch to which the VNIC is coupled) include both incoming and outgoing packets of the VM.

In some embodiments, the filter that duplicates (or redirects) the network traffic operates on a port of a physical switch (e.g., a software switch), to which the VNIC is coupled. The physical switch, in some embodiments, implements different logical ports of one or more logical switches that are coupled to the GVMs executing on the same machine, on which, the physical switch operates. In some embodiments, the filter is the same filter that generates duplicate packets for, or redirects the original packets to, a third party service appliance (e.g., a SVM) for network security examination (e.g., to a third party antivirus application).

The third stage 103 illustrates that the original packet 155 is received at the GVM 130 (e.g., at the VNIC of the GVM 130) and is being sent towards its final destination, application 135. This stage also shows that the packet monitoring module 160 has received the duplicate packet 175 (from the VNIC of the SVM 110), collected metadata (i.e., identification data) 185 from the packet (stored in the packet headers), and is storing the collected metadata (e.g., source internet protocol (SIP) and destination internet protocol (DIP) addresses) on the local storage 170.

Although in this figure, the packet monitoring module is shown as a separate module operating on the SVM 110, as shown below by reference to FIG. 2, in some embodiments the packet monitoring module is the same module as the collection agent. That is, the separate functions that are described above and below for the collection agent and packet monitoring module are performed by one agent/module in some embodiments. In some embodiments, this single module can be activated (or configured) on each port of a managed forwarding element that is coupled to a DCN in order to intercept the packets received from, or sent to the DCN.

In some embodiments, the packet monitoring module 160 (or another module), in addition to collecting and storing metadata, calculates additional statistical data with regards to the collected identification data and stores the calculated statistical data in the metadata storage 170 as well. For example, based on previously stored data and newly collected data, the packet monitoring module 160 of some embodiments calculates the total number of communications (or packets exchanged) between the same source and destination VMs for each received packet. In some other embodiments, however, the packet monitoring module 160 only stores raw metadata (i.e., the collected identification data) in the metadata storage 170 and the server 140 performs all of the calculations, based on the received data from the SVMs of different host machines in order to cluster the GVMs together on a particular host machine.

Although not shown in the figure, the reporting module 165 (e.g., a service daemon in some embodiments) of the SVM 110 provides the stored metadata to the central server 140 upon occurrence of a certain event. For example, in some embodiments, the reporting module 165 provides the identification information (and additional calculated statistical data) to the server 140 upon receiving a request from the server, while in other embodiments, the reporting module 165 delivers this information to the server 140 automatically and at certain time intervals.

One of ordinary skill in the art would realize that the SVM 110 may include many more modules and databases in addition to the illustrated modules and data structures, such as the metadata database stored in the data storage 170, for performing other tasks and storing other data. However, these additional modules and data structures are not shown in the figure for simplicity of description (although, some of the additional data storages and their tasks are described below by reference to FIG. 2).

For a host machine that executes one or more GVMs, some embodiments provide a novel virtualization architecture for utilizing a SVM on the host machine to collect metadata from the packets sent by and/or received for the GVMs. In some embodiments, the GVMs connect to a software forwarding element (e.g., a software switch) that executes on the host machine to communicate with each other and with other devices operating outside of the host. In this document, the term "packet" refers to any data message comprised of a collection of bits in a particular format sent across a network.

Figure 2:
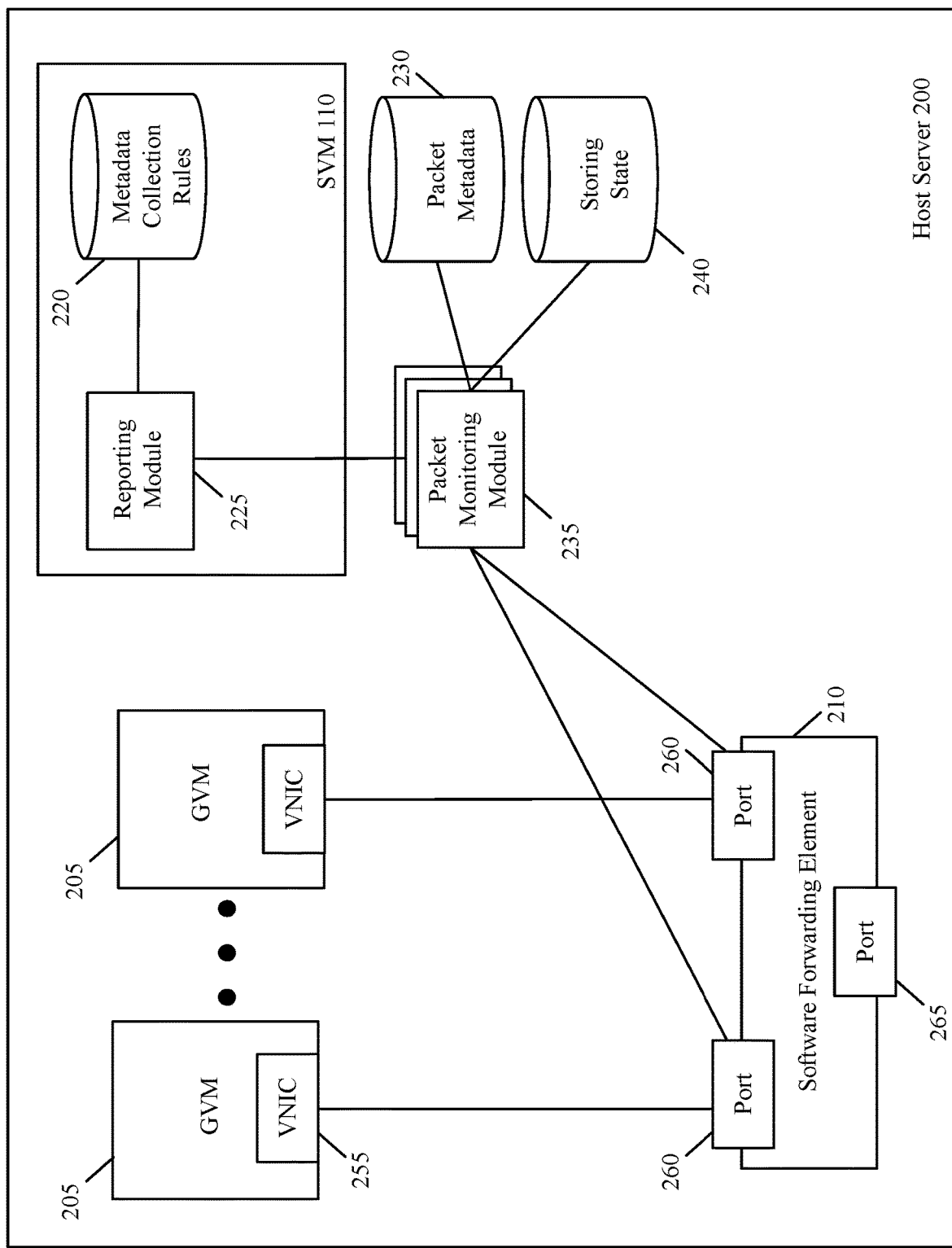
FIG. 2 illustrates an example of a service VM operating on a host computing device (e.g., a server).

FIG. 2 illustrates an example of a service VM operating on a host computing device (e.g., a server). The figure shows a host machine 200 that includes a SVM 110, a set of packet monitoring modules 235, a storing state data storage 240, and a packet metadata data storage 230. The SVM receives packets sent by and/or received for the GVMs 205 through the packet monitoring modules 235. In some embodiments, the packet monitoring modules 235 and the SVM 110 communicate with each other through an interface of the SVM.

In some embodiments, the set of packet monitoring modules 235 operates in the SVM 110 (e.g., in the kernel space of the hypervisor 200 on which the SVM operates). The host machine, in addition to the GVMs and SVM, also includes a physical forwarding element 210 that is coupled to the GVMs (i.e., the ports 260 of the physical switch are coupled to VNICs 255 of the GVMs). In some embodiments, each VNIC of a VM is associated with a unique port of the software switch. As described above, although shown as separate modules communicating with the ports 260 of the software switch 210, each packet monitoring module 235 of some embodiments is configured and activated on a port of the software switch and performs the functions of a collection agent described above and below. The set of packet monitoring modules 235 are shown as separate elements to simplify the figure and descriptions.

It is important to note that the software switch 210 is also referred to as a physical forwarding element or a physical switch in order to distinguish the software switch from logical forwarding elements, which are logical constructs that are not tied to the physical world. In other words, the software switch is referred to as a physical switch because the software switch exists and operates in the physical world, whereas a logical forwarding element (e.g., a logical switch or router) is simply a logical representation of a forwarding element that is presented to a user or a program in some embodiments.

The SVM 110 includes a reporting module 225 and a metadata collection rules data storage 220. As described above, in some embodiments, the software forwarding element 210 of the host machine, as well as the set of packet monitoring modules 235 and the storing state data storage 240 operate in the kernel space of the host machine 200 (e.g., in a hypervisor executing on the host machine), while the packet metadata data storage 230, the reporting module 225, and the metadata collection rules data storage 220 operate in the hypervisor's user space.

The GVMs are virtual machines (or servers) executing on top of the hypervisor (not shown). Examples of such virtual machines include web servers, application servers, database servers, etc. In some cases, all of the GVMs belong to one entity, e.g., an enterprise that operates the host machine. In other cases, the host machine executes in a multi-tenant environment (e.g., in a multi-tenant datacenter), and different GVMs may belong to one tenant or to multiple tenants of the datacenter.

As shown, each GVM 205 includes a virtual network interface controller (VNIC) 255 in some embodiments. Each VNIC is responsible for exchanging packets between its corresponding VM and the software forwarding element 210. Each VNIC connects to a particular port of the software forwarding element 210. The software forwarding element 210 also connects to a physical network interface card (PNIC) (not shown) of the host machine 200. In some embodiments, the VNICs are software abstractions of a PNIC that are implemented by the virtualization software of the host machine (e.g., by the hypervisor).

In some embodiments, the software forwarding element maintains a single port 260 for each VNIC of each VM. The software forwarding element 210 connects to a PNIC (e.g., through a NIC driver) to send outgoing packets from the VMs and to receive incoming packets for the VMs. In some embodiments, the software forwarding element 210 is defined to include a port 265 that connects to the PNIC's driver to send and receive packets to and from the PNIC. Although the switch 210 is shown as having a single port 265, a software switch, in some embodiments, includes two or more ports that connect to one or more PNICs of the host machine.

The software forwarding element 210 performs packet-processing operations to forward packets that it receives on one of its ports to another one of its ports. For example, in some embodiments, the software forwarding element tries to use data in the packet (e.g., data in the packet header) to match a packet to flow based rules, and upon finding a match, to perform the action specified by the matching rule (e.g., to hand the packet to one of its ports 260 or 265, which directs the packet to be supplied to a destination GVM or to the PNIC).

In some embodiments, the software forwarding element 210 is a software switch, while in other embodiments it is a software router or a combined software switch/router. The software forwarding element 210 in some embodiments implements one or more logical forwarding elements (e.g., logical switches or logical routers), along with other software forwarding elements executing on other host machines in a multi-host environment.

A logical forwarding element, in some embodiments, may span multiple host machines to connect GVMs that execute on different host machines but belong to one logical network. In other words, different logical forwarding elements can be defined to specify different logical networks for different users, and each logical forwarding element can be defined by multiple software forwarding elements on multiple hosts. Each logical forwarding element isolates the traffic of the GVMs of one logical network from the GVMs of another logical network that is serviced by another logical forwarding element. A logical forwarding element can connect GVMs executing on the same host and/or different hosts.

In hypervisors, software switches are sometimes referred to as virtual switches because they operate in software and they provide the GVMs with shared access to the PNIC(s) of the host. However, in this document, as described above, software switches are referred to as physical switches because they are items in the physical world. This terminology also differentiates software switches from logical switches, which are abstractions of the types of connections that are provided by the software switches.

The ports of the software forwarding element 210, in some embodiments, include one or more function calls to one or more modules that implement special input/output (I/O) operations on incoming and outgoing packets that are received at the ports. In some embodiments, one of these function calls can be to a packet monitoring module 235 that intercepts and duplicates (or redirects) the packets. Other examples of I/O operations that are implemented by the ports 260 include firewall operations, ARP broadcast suppression operations, DHCP broadcast suppression operations, etc. By implementing a stack of such function calls, the ports can implement a chain of I/O operations on incoming and/or outgoing packets in some embodiments. Also, in some embodiments, other modules in the data path (such as the VNICs, etc.) implement the I/O function call operations (such as the function calls to a packet collection module), instead of the ports of the software switch.

In some embodiments, a packet monitoring module intercepts the data messages (e.g., originated by different applications that run on a GVM) between the VNIC of the GVM and one of the software switch ports to which the GVM is coupled. The module generates and sends a duplicate of each data message (or redirects the original data message) to the SVM 210 of the same host machine. In other words, in some embodiments, while the original data message (e.g., packet) is sent towards its final destination, a packet monitoring module intercepts the packet (e.g., through an I/O function call), generates a copy of the packet, and sends the copy of the packet to a SVM.

In some other embodiments, the monitoring module intercepts the original packet and redirects the same packet to the SVM. In some such embodiments, the SVM (after reading the metadata carried by the packet) may or may not send the packet towards its original destination (i.e., the SVM, based on a rule defined for it, may redirect the packet to another destination, or alternatively the SVM may drop the packet based on the defined rule). In some embodiments this module (i.e., the set of modules) is part of the SVM. In some embodiments, each packet monitoring module 235 in the set of packet monitoring modules is assigned to receive packets from a particular port 260 of the software switch 210 (or from a particular VNIC 255 of a GVM 205). Each packet monitoring module 235 operates in the kernel space of the SVM (i.e., Kernel space of the hypervisor implementing the SVM) and receives the packets from either a VNIC of a GVM or a software switch port to which each GVM couples. The packet monitoring module then determines whether the packets' metadata must be saved or not.

Although shown as a set of packet monitoring modules, some embodiments provide a single module that handles all of the packets received from all of the GVMs. In yet some other embodiments, each packet monitoring module is assigned to a set of ports of the software switch to which a set of GVMs running on the host machine couples. For example, for each group of GVMs that execute on the host machine, one packet monitoring module is assigned to handle the data messages sent from or received by the GVMs of the group.

The SVM 210, in some embodiments, is a third-party security appliance (e.g., a third-party service VM) that provides third-party security services (e.g., antivirus/anti-malware services, vulnerability management services, etc.). In some such embodiments, when a third-party service appliance is activated (instantiated) on a host machine, packets that are received and/or sent by other VMs operating on the same host machine might go through this security appliance for a security check. Instead of, or in conjunction with a third-party security appliance, some embodiments provide a dedicated SVM in each host machine that operates on the host machine to monitor network traffic sent from and/or to the GVMs 205 of the host machine. In yet other embodiments, one of the GVMs 205 may provide this monitoring service.

Multiple packets can have the same packet attribute sets (source and destination layer 3 addresses, source and destination layer 4 addresses, protocol, etc.), when the packets are part of one data flow that is associated with one communication session between two machines. In some embodiments, the packet monitoring module 235 sends the initial packet of each data flow to a separate module (e.g., to the reporting module 225) to determine whether the metadata (i.e., identification data) of the packets of the flow should be stored.

In some such embodiments, when the reporting module 225 determines that the initial packet's information must be stored, the packet monitoring module 235 stores the metadata of each subsequent packet of the flow without sending the packets to the reporting module again. In some other embodiments, the packet monitoring module 235 determines whether to store packets' metadata or not on its own and without consulting any other module (even if the packet is the first packet of a data flow).

In some embodiments, after receiving a decision made for an initial packet of a flow, the packet monitoring module 235 stores the returned decision in the storing state data storage 240 that can be subsequently used to process other packets with similar attribute sets. Specifically, the storing state data storage 240, in some embodiments, stores the decisions that the reporting module 225 returns for different packet attribute sets. In some embodiments, the storing state data storage 240 stores each returned decision with an identifier (e.g., a hash value) that is generated from the corresponding packet's attribute set. Before checking with the reporting module 225, the packet monitoring module 235 of some embodiments checks the storing state data storage 240 to determine whether this storage has a cached decision for this packet attribute set. If not, the packet monitoring module 235 then requests a determination to be made by the reporting module 225.

In some embodiments, the packet monitoring module 235 receives the metadata from different packet headers of each packet and stores the received metadata in the local data storage 230 (e.g., in a user space of the SDCN). That is, each time a packet is received at the SVM 110, an in-kernel callback function is triggered, with the received packet as a parameter. The triggered callback function then extracts packet level metadata and stores the extracted metadata in the packet metadata data storage 230. The received metadata includes metadata stored in different headers of the packet such as source and destination internet protocol (IP) addresses, timestamp, packet length, etc. In some embodiments, in addition to storing the metadata, the packet monitoring module 235 also calculates and stores statistical information about the data exchanges between the GVMs 205. For example, the packet monitoring module 235 calculates the total number of packets exchanged between each pair of GVMs 205 based on the collected metadata.

The reporting module 225 of some embodiments uses the metadata collection rules data storage 220 (e.g., through the packet monitoring module 235) to determine whether identification and other data should be collected from a packet or not. The metadata collection rules database 220, in some embodiments, contains identification data of the VMs, such as on which host each VM is currently executing. When the reporting module receives a request from the packet monitoring module, the reporting module matches the identification data in the packet against data stored in the metadata collection rules database in order to make the determination.

For example, when the reporting module 225 receives a packet that shows the source of the packet is VM1 while the destination of packet is VM2, the reporting module retrieves the corresponding data of VM1 and VM2 from the metadata collection rules database 220 to determine whether these two VMs are currently operating on two different host machines. If the reporting module realizes that the VMs are operating on separate hosts, the reporting module sends an answer back to the packet monitoring module 235, indicating that the identification data should be collected from the packet (and other packets of the same flow). On the other hand, if the two VMs are operating on the same host, the metadata of the packets will not be collected and stored. The metadata collection rules database is populated, in some embodiments, by a controller, or manager of the network in order to provide different information about the VMs.

Some embodiments employ a different module (i.e., different than reporting module) to make a decision on data collection from packets. In some other embodiments, the packet monitoring module makes this decision and does not send a request to any other module for this purpose. Yet, some other embodiments do not use a decision making module. In some such embodiments, the packet monitoring module examines every packet that it receives and collects and stores the relevant data (e.g., identification data) of the packet in the packet metadata database 230. A central server that receives these stored metadata, cluster the GDCNs based on portions of the data that the server receives from the SDCNs of different host machines.

In addition to providing the decision on whether to collect packets' identification data or not, the reporting module 225 of some embodiments, provides the collected data to a central server (e.g., a controller or a manager). The reporting module of some embodiments, upon occurrence of a certain event (e.g., receiving a request from the central server), retrieves the data from the packet metadata data storage 230 and sends the retrieved data to the server. As described above, in some embodiments, the reporting module 225 periodically and without receiving any request retrieves and sends the data to the central server.

Figure 3:
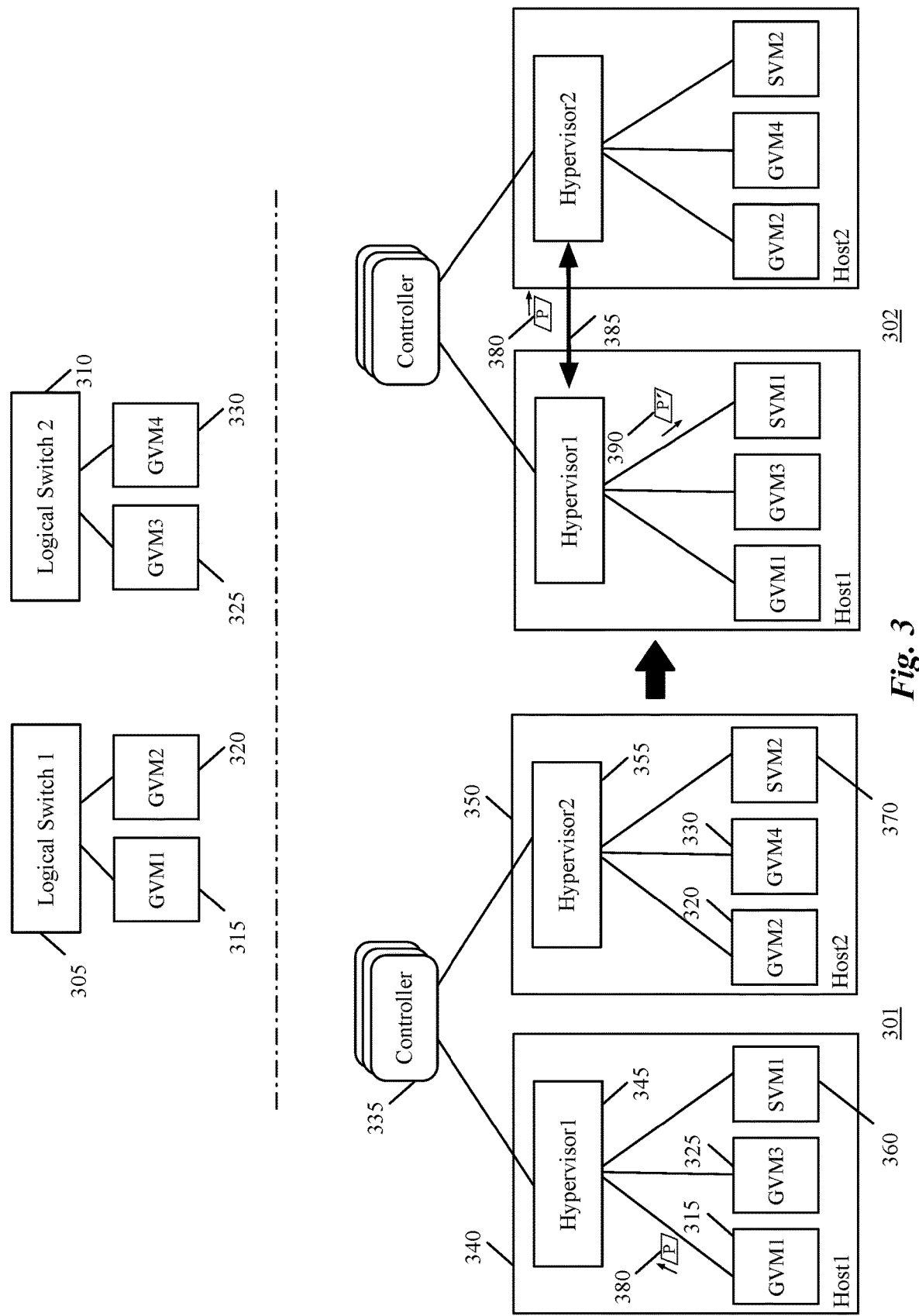
FIG. 3 illustrates an example of a network communication between two guest VMs that operate on two different host machines and mirror the communication to a service VM for data collection.

FIG. 3 illustrates an example of a network communication between two guest VMs that operate on two different host machines and mirror the communication to a service VM for data collection. Specifically, this figure shows that even though GVMs of a tenant of a hosting system are logically connected to each other through a single logical switch, the GVMs operate on two different host machines. That is, since the GVMs are instantiated on two different host machines, the logical ports of the logical switch, to which the GVMs are logically coupled, are implemented across these different host machines. The two GVMs, however, frequently exchange data with each other (e.g., because they implement different instances of the same application for a tenant), and as such should be clustered together to operate on a single host, thereby reducing interhost communications between the two host machines.

The top half of FIG. 3 shows a logical network architecture which includes two logical switches 305 and 310. The logical switches might be connected to each other (and to other network entities) through a logical router (not shown). The GVMs 315 and 320 are logically connected to each other through the logical switch 305, while the GVMs 325 and 330 are logically connected to each other through the logical switch 310. These two logical switches, as stated above, might belong to a logical network that includes many more logical network entities (e.g., logical routers, logical firewalls, etc.).

A logical network, logically connects different DCNs (e.g., of a tenant in a hosting system), which run on one or more host machines, to each other and to other end machines. In some embodiments, a user defines a logical network topology (i.e., defines the logical network elements and the connections between these elements) for the logical network through a management and control system of the logical network. The management and control system (e.g., a manager machine or application) of a logical network receives the logical network elements, generates configuration data, and pushes the configuration data (i.e., initial as well as runtime configuration data) to a set of physical nodes (e.g., host machines, gateway machines, etc.) of the hosting system in order to configure the physical nodes to implement the logical network entities.

In some embodiments, different managed forwarding elements (e.g., managed software switches) operating on different host machines implement the logical entities (e.g., different logical ports of a logical switch, different logical firewalls, etc.). For example, in order to implement a logical port of a logical switch to which a VM is coupled, the logical port of the logical switch is mapped to a physical (software) port of the managed forwarding element, to which the VM is connected.

The bottom half of FIG. 3 shows, through two operational stages 301 and 302, how a data message sent by a GVM towards another GVM is duplicated and sent to a SVM. The bottom half of the figure also shows how the logical switches 305 and 310, shown in the top half of the figure, are implemented on two different host machines, and how the GVMs 315-330 that are connected to these logical switches are distributed across these host machines. The bottom half of the figure includes a controller 335, in a set of controllers and managers, connecting to two host machines 340 and 350. Host machine 340 includes a hypervisor 345, two guest VMs 315 and 325, and a service VM 360. Host machine 350 includes a hypervisor 355, the other two guest VMs 320 and 330, and a service VM 370.

The controller 335, in the illustrated example, is a central machine that gathers the collected metadata from the different SVMs and clusters the GVMs that communicate with each other more frequently based on the gathered data. In some embodiments, the machine that gathers this data from different host machines is a dedicated server (separate from a controller of the management and control system). In some such embodiments, the dedicated server, however, is controlled and managed by the management and control system of the network.

In some embodiments, the controller 335 is part of a centralized management and control system (shown as a set of controllers and managers in the figure) that performs management and control operations for managing the network entities (e.g., of a datacenter, hosting system, etc.). The management and control system of some such embodiments is responsible for (1) receiving definitions of different logical network elements of different logical networks (e.g., belonging to different tenants), and (2) distributing the logical configuration and forwarding data to the managed forwarding elements (e.g., executing in the hypervisors 345 and 355) to implement the logical network entities of the logical networks. In addition to network topologies, the management and control system also receives a definition of a GDCN clustering policy for one or more logical networks from a user (e.g., a network administrator, a tenant, etc.).

The clustering policy that is defined by a user may include a maximum number of communications between two VMs that can be considered as normal communication (i.e., a threshold level of communication between two VMs, in terms of total packets or data exchanged or in terms of a rate of packet or data exchanged, above which the VMs are considered to be frequently-communicating VMs), a maximum number of VMs that can be grouped together in each cluster, clustering algorithms that should be used to group the frequently-communicating VMs together, etc.

In some embodiments, a local controller (not shown) executes on each host machine (e.g., in a hypervisor of the host machine) and configures a corresponding managed forwarding element (MFE) to perform forwarding operations of the logical forwarding elements. MFE, in some embodiments, is another name for a software switch, such as the software switch 210 described above by reference to FIG. 2. In some such embodiments, each local controller receives common forwarding behavior that can be applied to VMs of several host machines, and converts this data to customized forwarding data that can be applied only to a single host machine on which the local controller executes.

In some embodiments, the connections of the VMs to logical switches (e.g. the first and second logical switches described above) are defined using logical ports of the logical switches, which are mapped to the physical ports of the MFEs. For instance, in the illustrated example, a first logical port of the logical switch 305 is mapped to a physical port of an MFE that operates in the hypervisor 345 and is coupled to GVM 315 running on the host machine 340. The second logical port of the logical switch 305, however, is mapped to a physical port of a second MFE that operates in the hypervisor 355 and is connected to GVM 320 running on the host machine 350.

As described above, a management and control system manages and controls the network data communications between the different DCNs of a logical network (e.g., between the VMs in the illustrated example) by controlling the data communications between the MFEs that operate in the hypervisors and that implement the logical forwarding elements. The management and control system communicates management and control data with the MFEs (e.g., through the local controllers) in order to control the data exchange between the MFEs. In some embodiments, the MFEs (e.g., a port of each MFE) operate as virtual tunnel endpoints (VTEPs) that ultimately exchange the logical network data between each other in order to exchange the network traffic between the DCNs of different host machines.

After describing the different elements shown in the figure, the operational stages 301 and 302 are now described. In the first stage 301, the GVM 315 operating on the host machine 340 initiates a packet 380 to be forwarded to the GVM 320 operating on the host machine 350. GVMs 315 and 320 could be the same virtual machines as the GVMs 120 and 130, shown in FIG. 1. As such, the packet 380 could be a packet that is initiated by application 125 executing in GVM 120 in order to be sent to application 135 executing in GVM 130 by reference to FIG. 1. As shown in FIG. 3, GVM 315 sends the packet to a software switch (not shown) operating in the hypervisor 345 to perform forwarding processing on the packet (based on the packet headers data) and forward the packet towards its ultimate destination.

The software switch (or MFE), after receiving the packet, executes the necessary forwarding pipelines of the logical network elements (e.g., logical switch 305) in order to identify the next destination of the packet and then forwards the packet to the identified destination. For example, when the MFE executing in the hypervisor 345 receives the packet 380 from GVM 315 that couples to a first port of the logical switch 305, the MFE performs the network forwarding processing for this logical switch. The MFE, also performs the forwarding processing for any additional logical forwarding element (e.g., a logical router if the logical switch is connected to the logical router).

In the illustrated example, based on the forwarding processing, the MFE decides to send the packet from the first logical port of the logical switch 305, implemented by the MFE, to a second logical port of the logical switch, which is coupled to the GVM 320. Since the second port of the logical switch 305 is implemented by a second MFE executing in the hypervisor 355 of host 350, the first MFE sends (tunnels) the packet to the host machine 350. But before the packet is sent towards its next destination, a copy of the packet (or the packet itself) should be sent to the SVM 360 in order to collect identification data from the packet, as described in the next stage 302.

The second stage 302 shows that a copy of the packet is generated (i.e., packet 390) and being sent to the SVM 360. In order to do so, as described above, a packet collection module operating in the hypervisor 345 (between the VNIC of the GVM 315 and the software port of the first MFE) generates a duplicate of the packet and sends the duplicate packet 390 to the SVM 360. In some embodiments, the collection agent only sends the outgoing packets (i.e., packets that are initiated and sent out by the GVM) to the SVM. In some other embodiments, the collection agent sends both outgoing packets (from the GVM) and incoming packets (to the GVM) to the SVM. In yet some other embodiments, a user can configure the source of the packets to be analyzed for clustering (e.g., to be the ingress port, the egress port, or both ports of the GVM) through the clustering policy that the user defines for the clustering server or controller.

The second stage also shows that the original packet 380 is being sent from the first MFE operating in the hypervisor 345 to a second MFE operating in the hypervisor 355 through a tunnel 385. In order to do so, the first MFE encapsulates the packet with necessary tunneling information (e.g., IP addresses of source destination VTEPs, etc.) and tunnels the packet towards the destination VTEP implemented by the second MFE. The second MFE receives the packet 380, decapsulates the packet, and then forwards the packet to GVM 320 (e.g., based on the MAC and IP addresses stored in the L2 and L3 headers of the packet). GVM 320, after receiving the packet, forwards the packet (i.e., a VNIC of the GVM performs forwarding processing and forwards the packet) to its final destination (e.g., an application that runs on the GVM 320).

While the different GDCNs and SDCNs are shown as VMs in this figure and other figures above and below, it should be understood that other types of data compute nodes (e.g., namespaces, containers, etc.) may connect to logical forwarding elements in some embodiments. It should also be understood that a logical network, in some embodiments, in addition to the illustrated logical switches, may include other logical network entities (e.g., logical routers, logical firewalls, logical load balancers, etc.) that are placed on different logical paths of the logical network.

Figure 4:
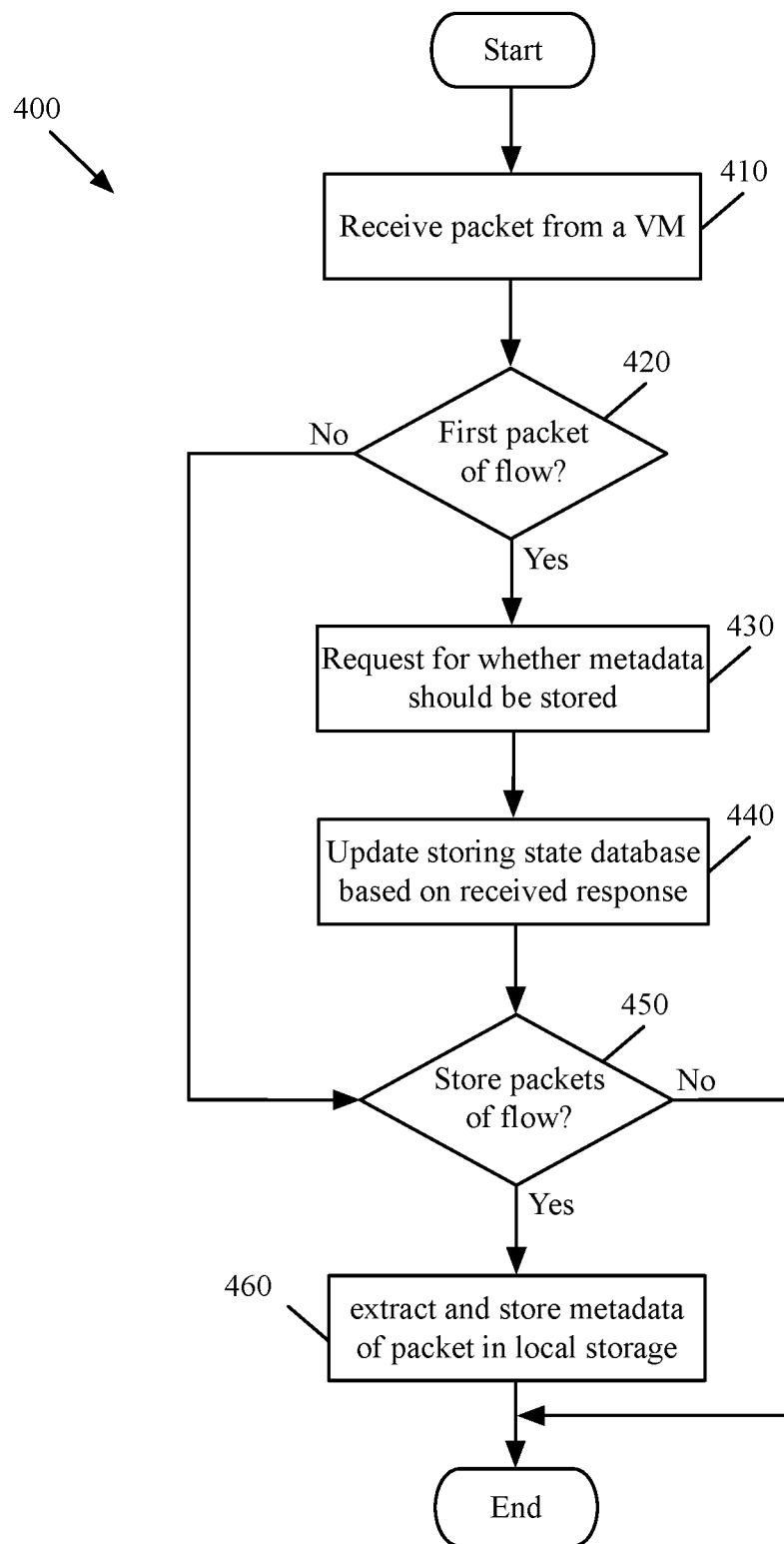
FIG. 4 conceptually illustrates a process of some embodiments for receiving network traffic communicated with a GDCN and storing statistical information collected from the network traffic.

FIG. 4 conceptually illustrates a process 400 of some embodiments for receiving network traffic communicated with a GDCN and storing statistical information collected from the network traffic. The statistical information includes the source and destination of traffic in some embodiments, while in some other embodiments, this information can include the number of communications between each source and destination. The process, in some embodiments, is performed by a service DCN that operates on each host machine. More specifically, a particular module executing on the SDCN, such as the packet monitoring module 235 described above by reference to FIG. 2 performs the process 400 in some embodiments.

The process starts by receiving (at 410) a packet from a VM operating on the same host machine as the SVM. As described above, the process receives the packet from a packet collection agent operating on the VM. The packet can be a duplicate of an outgoing packet that is sent from one of the applications running on the VM, or an incoming packet destined for a particular application executing on the VM. After receiving the packet, the process determines (at 420) whether the packet is a first packet of a flow. For example, in some embodiments, the process identifies a TCP SYN packet (or equivalent handshake-opening packet) as a first packet of a data flow, and other packets as belonging to existing data flows.

When the process determines that the packet is not a first packet of a data flow, the process proceeds to operation 450, which will be described below. On the other hand, when the process determines that the packet is a first packet of a data flow, the process sends a request (at 430) to a second module, asking whether the metadata carried in the packet should be stored. The process then updates (at 440) a local data storage (e.g., storing state database 240 described above by reference to FIG. 2) with the decision received from the second module. For example, the process adds a record to the local database indicating that no metadata from the packets of the data flow, to which the first packet belongs, should be extracted and stored, when the decision received from the second module indicates so.

As described above, the second module can make such decisions based on the information stored in a databased in some embodiments. For example, the information may include different identification data about the source and destination of the packet. This identification data enables the module to determine whether the source and destination of the packet are operating on the same host or on two different hosts.

After receiving a decision and updating the local data storage, the process determines (at 450) whether the metadata (e.g., source and destination identification data) carried by the packet should be extracted and stored. If the process determines that the identification data should not be stored, the process ends. If the process determines that the identification data should be stored, the process retrieves (at 460) the identification data from the packet and stores this data in a data storage that contains all the statistical metadata. For instance, the process retrieves the layer 3 information of the packet (e.g., source and destination IPs), carried in the layer 3 headers of the packet, and stores this information in a local database such as packet metadata data storage 230 described above by reference to FIG. 2. After storing the identification data, the process ends.

The specific operations of the process 400 may not be performed in the exact order shown and described. The specific operations may not be performed in one continuous series of operations, and different specific operations may be performed in different embodiments. For example, the process of some embodiments does not send a request to another module for determining whether the metadata of the packet should be stored or not. In some such embodiments, the process makes such a determination itself by accessing a database that keeps the status of the different source and destination nodes. Alternatively, the process of some embodiments stores the metadata of every packet it receives (from the different VMs that execute on the same host machine) without making a determination as to whether this information should be saved or not. Additionally, the process 400 could be implemented using several sub-processes, or as part of a larger macro process.

As stated above, the SDCNs of different host machines, in some embodiments, provide the stored network traffic information to a central server (e.g., a controller of the network or a separate server communicating with a controller) for the central server to determine which GDCNs should be clustered (grouped) together. In some embodiments, a service daemon operating in the user space of each SDCN provides this information to a central controller upon occurrence of a certain event. For example, in some embodiments, the SDCNs provide the information upon receiving a request from the controller, while in other embodiments, the SDCNs deliver the information periodically and at certain time intervals. Yet, in some other embodiments, the SDCNs deliver the inter-DCN traffic data to the controller upon occurrence of other triggering events. For example, when the number of packets exchanged between a group of GDCNs exceeds a threshold, some embodiments distribute the information to a controller to cluster the GDCNs together.

In some embodiments, a user (e.g., a datacenter network administrator, a tenant of a hosting system, etc.) defines the amount of data exchange that establishes a frequent communication between a pair of GDCNs. For example, the user may specify that when the number of packets exchanged between two GDCNs exceeds a threshold, the GDCNs should be considered as frequently-communicating GDCNs and as such, should be clustered together. In other embodiments, the user may specify a threshold amount of data exchanged (e.g., in bytes, rather than packets), or a threshold for the rate at which packets (or bytes of data) are exchanged, for GDCNs to be considered frequently-communicating for clustering purposes. The user may also define one or more clustering algorithms that should be used to group the frequently-communicating GDCNs together. In some embodiments, the user defines the communication frequency policy and clustering algorithms through a set of application programming interface (API) calls to a management and control system of the network.

Figure 5:
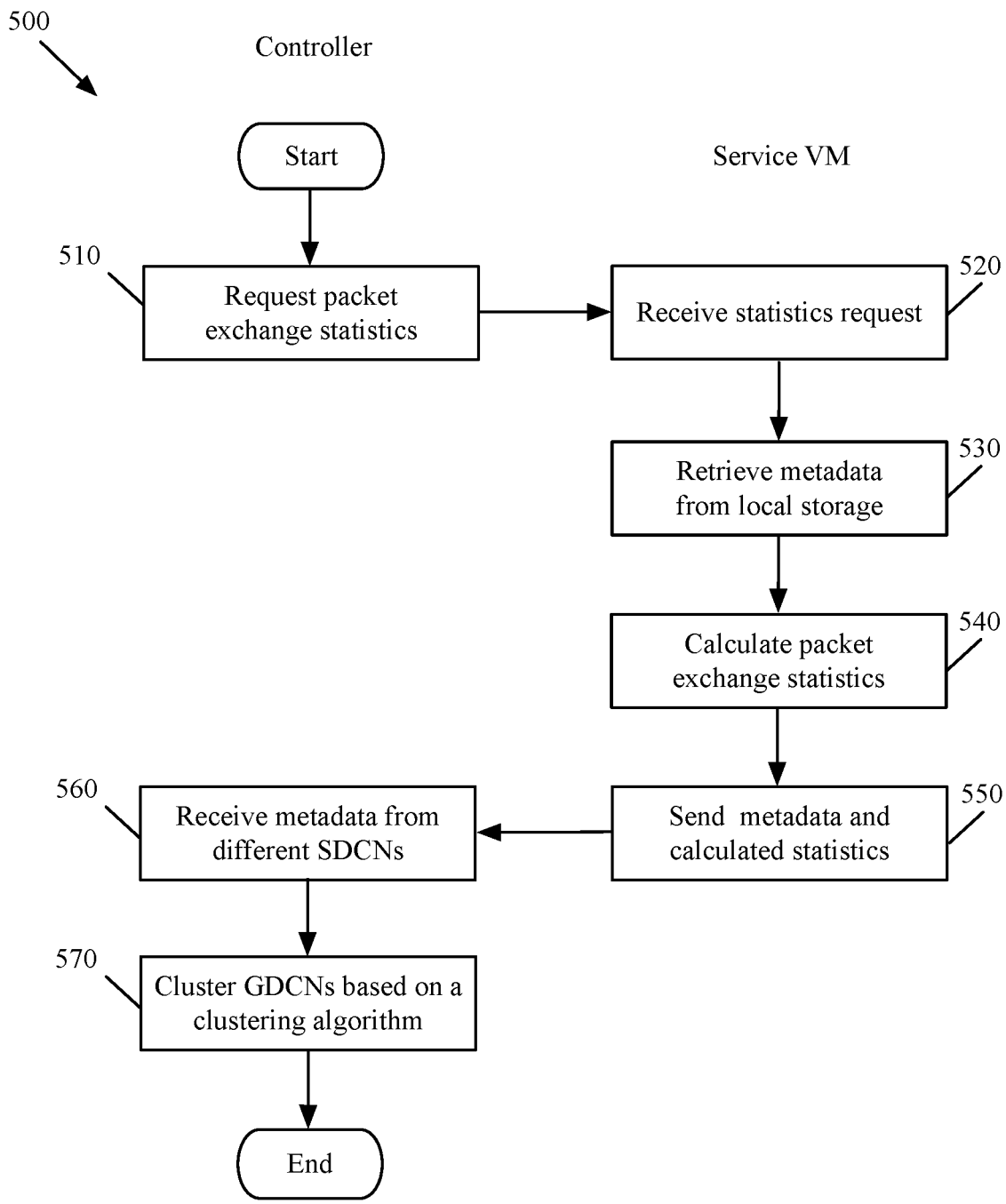
FIG. 5 conceptually illustrates the interactions between a controller and a service VM (e.g., a service daemon operating on the SVM) in order to gather statistical data about the network traffic exchanged between different VMs.

FIG. 5 conceptually illustrates the interactions between a controller and a service VM (e.g., a service daemon operating on the SVM) in order to gather statistical data about the network traffic exchanged between different VMs in some embodiments. This set of interactions represents a VM clustering process 500 of some embodiments to reduce or eliminate interhost network traffic in a hosting system. As shown in this figure, the clustering process 500 starts when a controller requests (at 510) packet exchange statistics from one or more service VMs operating on one or more host machines.

The service daemon of the SVM receives (at 520) the request from the controller. As described above, such a request is received periodically in some embodiments, while in some other embodiments, the controller sends the request when a triggering event occurs. The triggering event can be a user request, a system reboot, etc. The service daemon then retrieves (at 530) the metadata stored in a local data storage such as packet metadata data storage 230 described above by reference to FIG. 2. As described above, this packet metadata is stored by a packet monitoring module of the SVM which collects the metadata from the different collection agents operating on different VMs of the host machine.

Based on the retrieved data, the process calculates (at 540) packet exchange statistics for the different VMs that operate on the host machine. For instance, for a first VM operating on the same host machine as the SVM operates, the process determines that the first VM has communicated X number of packets with a second VM that operates on a different host machine.

The process of some embodiments can also determine that out of X communications, Y number of communications belong to outgoing packets (from the first VM to the second VM), while Z number of communications belong to incoming packets (from the second VM to the first VM). In some other embodiments, the stored data, however, only covers the outgoing packets from each host machine, and the controller, which receives the statistics from all of the host machines, can put the numbers together to identify the correct number of communications between each pair of VMs.

The process then sends (at 550) the retrieved metadata and calculated packet statistics to the controller. After receiving (at 560) this data, the controller groups (at 570) the VMs based on the received data (from the SVM shown in the figure as well as other SVMs operating on other host machines) and a clustering algorithm. In the clustering algorithm, besides the number of VMs in each group, many other factors are also taken into account. Some of these factors include, number of host machines, current workload on each host machine, performance capacity (e.g., CPU, memory, network bandwidth, etc.) of each host machine, etc.

For example, even if a simple clustering algorithm determines that 10 groups that each has 10 VMs should be operating on 10 different host machines, the process may reduce the number of VMs in a particular group that is supposed to be placed on a weaker (i.e., less CPU, memory, etc.) host machine, while increasing the number of VMs in another group that is supposed to be placed on a stronger host machine. The process then ends.

The specific operations of the process 500 may not be performed in the exact order shown and described. The specific operations may not be performed in one continuous series of operations, and different specific operations may be performed in different embodiments. For example, in some embodiments, a service module of a SDCN does not calculate packet exchange statistics (as described above at operation 540) and simply provides all of the stored metadata to the controller. In some such embodiments, the controller performs all of the necessary calculations and identifies the frequently-communicating VMs without the help of any of the SDCNs. Additionally, the process 500 could be implemented using several sub-processes, or as part of a larger macro process. For example, operation 570 of the process 500 can be divided to several other operations of the same or different process shown below by reference to FIG. 6.

As described above, the management and control system of some embodiments utilizes the received statistical information as input for the hierarchical clustering algorithms defined for the system to group different sets of frequently-communicating GDCNs in different clusters. The management and control system (e.g., one or more controllers in the management and controller system), after identifying the different groups, directs one or more migration modules operating on the host machines to move the GDCNs of each cluster to a particular host machine in order to optimize inter-host network communications.

Some embodiments load balance the GDCNs that are to be distributed among the host machines, before distributing the groups, if the numbers of GDCNs in different groups are not balanced. For example, when the number of guest VMs that are to be moved to a first host machine is considered to cause the host machine to be overloaded, some embodiments move a portion of the VMs to a second host machine. In some such embodiments, the extra VMs, however, are migrated to a host machine that operates on the same rack as the first host machine (in order to minimize inter-rack data communications).

Figure 6:
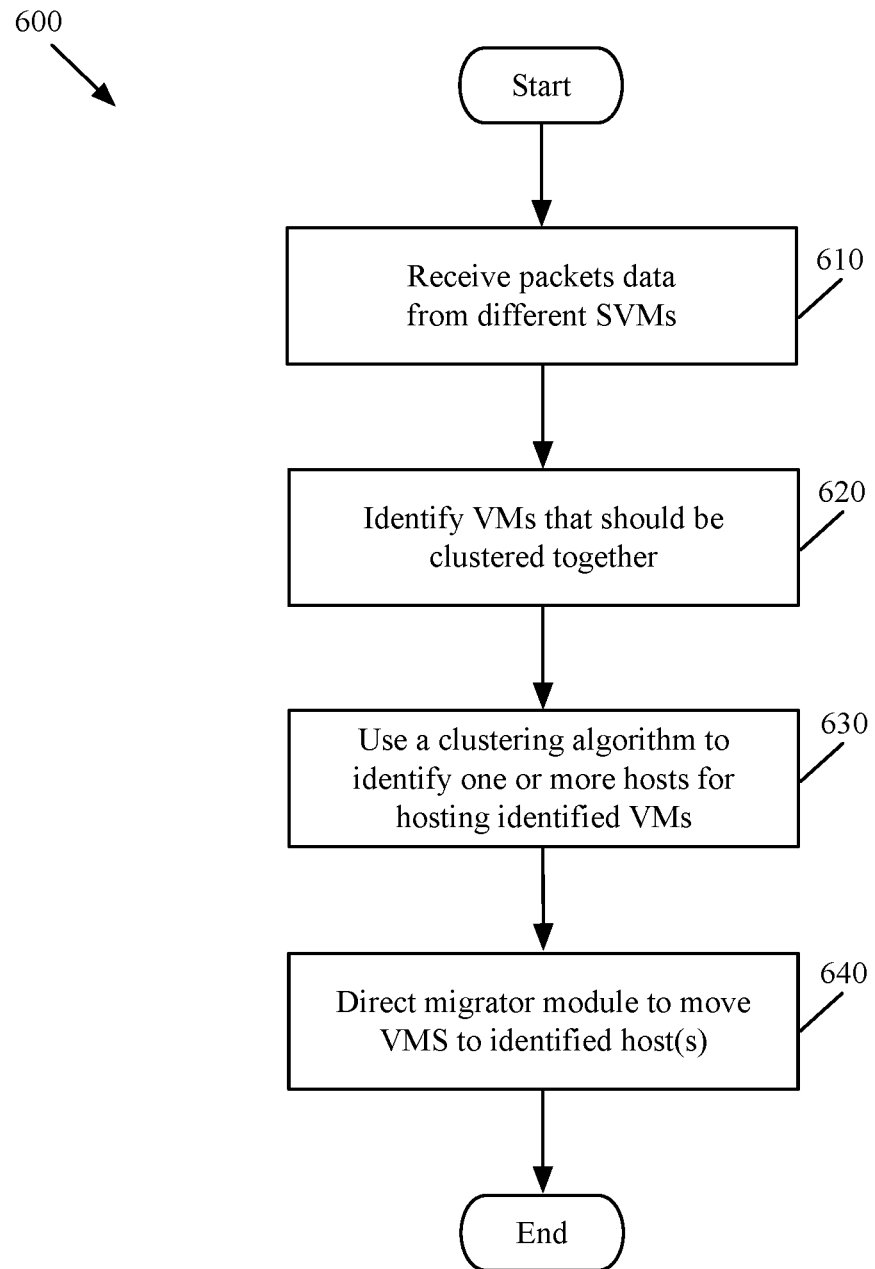
FIG. 6 conceptually illustrates a process of some embodiments for clustering a set of VMs together and migrating the VMs of the cluster to a particular host machine.

FIG. 6 conceptually illustrates a process 600 of some embodiments for clustering a set of VMs together and migrating the VMs of the cluster to a particular host machine. The process is performed by a central server (e.g., a controller) of a hosting system in some embodiments. In some embodiments, one central server is responsible for gathering packets data from all of the SVMs of the hosting system. In some other embodiments, different sets of host machines are assigned to different controllers and for each set a corresponding controller decides how to group the VMs on that set of host machines. In some other embodiments, the different controllers that are associated with different sets of host machines communicate with a central controller which ultimately decides how to cluster the VMs on the different host machines of the hosting system.

As shown in the figure, the process starts by receiving (at 610) packets data from different SVMs that execute on different host machines (of the hosting system). Each SVM sends the packets data communicated with the VMs of the same host machine on which the SVM executes. The process identifies (at 620) the VMs (i) that execute on different host machines and (ii) that exchange network data with each other on a regular basis. The number of VMs that should be clustered together could range from two VMs to several hundreds or more VMs, depending on how active a distributed application that is implemented by the VMs is.

The process then employs (at 630) a clustering algorithm to cluster the VMs into one or more groups such that each VM within a particular group communicates more data with the other VMs of the particular group in comparison with the VMs within other groups. In some embodiments, the process uses a load balancing algorithm that uses different criteria (e.g., number of hosts, workload on each host, availability and strength of different resources of each host, etc.) in order to cluster the VMs into different groups. Below, two different clustering algorithms that can be employed by the process of some embodiments are described. However, the process can use any other known clustering algorithm to group the frequently-communicating VMs that run on different host machines together.

In order to design a clustering algorithm, some embodiments define the clustering problem in a graph theory language. That is, for a graph G=<V, E, W>, each node v in V represents a VM, and each edge e in E represents the communication relation between a pair of VMs. The weight associated with e represents the traffic loads between the corresponding two VMs. In some embodiments, a desired clustering algorithm partitions or groups V (i.e., the VMs) into <V1, V2, . . . , Vk>, such that the edge with the largest weight between Vi and Vj (where $\forall i, j \in [1, k]$) is minimized (i.e., the VMs that communicate with each other the most, are closest together in a group). The optimization objective, in some embodiments, is similar, but not identical, to that of the clustering problem in machine learning.

Without any load balancing constraints (e.g., computing resources of each host), all connected VMs can be simply grouped together and the output results would be the set of connected components in the above-described graph. However, the workloads of the different host machines have to be balanced as well, since the resources assigned to each host machine are different and limited. Some embodiments implement a hierarchical clustering algorithm (similar to minimal spanning tree algorithm) by setting the expected number of VM groups to be equal to the number of involved host machines. Below is the first hierarchical clustering algorithm, in which the expected number of output VM groups is the same as the number of host machines involved in the evaluation.

First Clustering Algorithm:
Input: A graph G =< V, E, W >,
Each node v in V represents a VM, and each edge e in E represents the communication relation between two VMs. The weight associated with e represents the traffic loads between the corresponding two VMs. The number of involved hosts, H.
Output: A partition (group) of V, < V1, V2, . . ., Vk >,
such that the edge with largest
weight between Vi and Vj (for $\forall i, j \in [1, k]$) is minimized.
 1: Create a Max Heap of the edges in E;
 2: Create |V| groups, each of which contains just one VM;
 3: Define N as the number of remaining groups and initialize it as |V|;
 4: while N >= H && The Max Heap is not empty do
 5:     Pop the root of the Max Heap, e, and obtain e's two end points, u and v;
 6:     Find the VM groups V' and U, in which v and u located respectively;
 7:     if V' != U then
 8:         Merge V' and U;
 9:         N --;
10:     end if
11: end while
12: return the remaining groups whose sizes are greater than 1;

In the second algorithm, the fact that the output VM groups may be skewed (i.e., some of the groups contain several VMs while other groups merely contain one or two VMs) is taken into consideration. Such kind of skewed VM groups may still result in host machines with unbalanced workloads. In order to resolve this issue, some embodiments set a load balance factor (lbf) as the average number of VMs on each host machine (i.e. the number of VMs divided by the number host machines) plus one. As such, each output VM group contains lbf VMs at most.

```
Second Clustering Algorithm:
Input: A graph G =< V, E, W >,
Each node v in V represents a VM, and each edge e in E represents
the communication relation between two VMs. The weight associated
with e represents the traffic loads between the corresponding two
VMs. The number of involved hosts, H.
Output: A partition (group) of V, < V1, V2, . . ., Vk >,
such that the edge with largest
weight between Vi and Vj (for ∀i, j ∈ [1, k]) is minimized.
 1: Create a Max Heap of the edges in E;
 2: Create |V| groups, each of which contains just one VM;
 3: Define N as the number of remaining groups and initialize it as |V|;
 4: while N >= H && The Max Heap is not empty do
 5:    Pop the root of the Max Heap, e, and obtain e's two end points,
       u and v;
 6:    Find the VM groups V' and U, in which v and u located
       respectively;
 7:    if V' != U && V' + U ≤ lbf then
 8:       Merge V' and U;
 9:       N--;
10:    end if
11: end while
12: return the remaining groups whose sizes are greater than 1;
```

As shown in the above, the second algorithm is different from the first algorithm by adding "V'+U≤lbf" as a second condition in the "if clause" of line 7 of the algorithm. With this additional condition, the second algorithm will result in more balanced VM groups operating on the host machines. It is also important to note that both algorithms return the VM groups that contain at least two VMs, since a VM group with only one VM means that the VM does not communicate with other VMs and such a VM group yields no information as to how to optimize the interhost traffic. Lastly, both algorithms have computational complexity of $O(|E|)$ in some embodiments, where $|E|$ is the number of edges. Since there are $O(|N|2)$ edges in a graph with $|N|$ nodes, the complexity for these algorithms are $O(|N|2)$ in terms of number of nodes.

Returning to FIG. 6, after clustering the VMs into different output groups, the process of some embodiments directs (at 640) a set of migration modules operating on the host machines to migrate the VMs of each group to a particular host machine so that the number of interhost communications is minimized. That is, if the process determines that the VMs can be clustered into only one group, the process directs the migration modules of the different hosts to migrate the VMs to a single host. However, if the process determines that the VMs should be clustered into two or more groups, the process directs the migration modules of the different hosts to migrate the VMs to two or more hosts that operate on the same rack, in order to minimize inter-rack network traffic communication. The process then ends.

The specific operations of the process 600 may not be performed in the exact order shown and described. The specific operations may not be performed in one continuous series of operations, and different specific operations may be performed in different embodiments. Additionally, the process 600 could be implemented using several sub-processes, or as part of a larger macro process.

Figure 7:
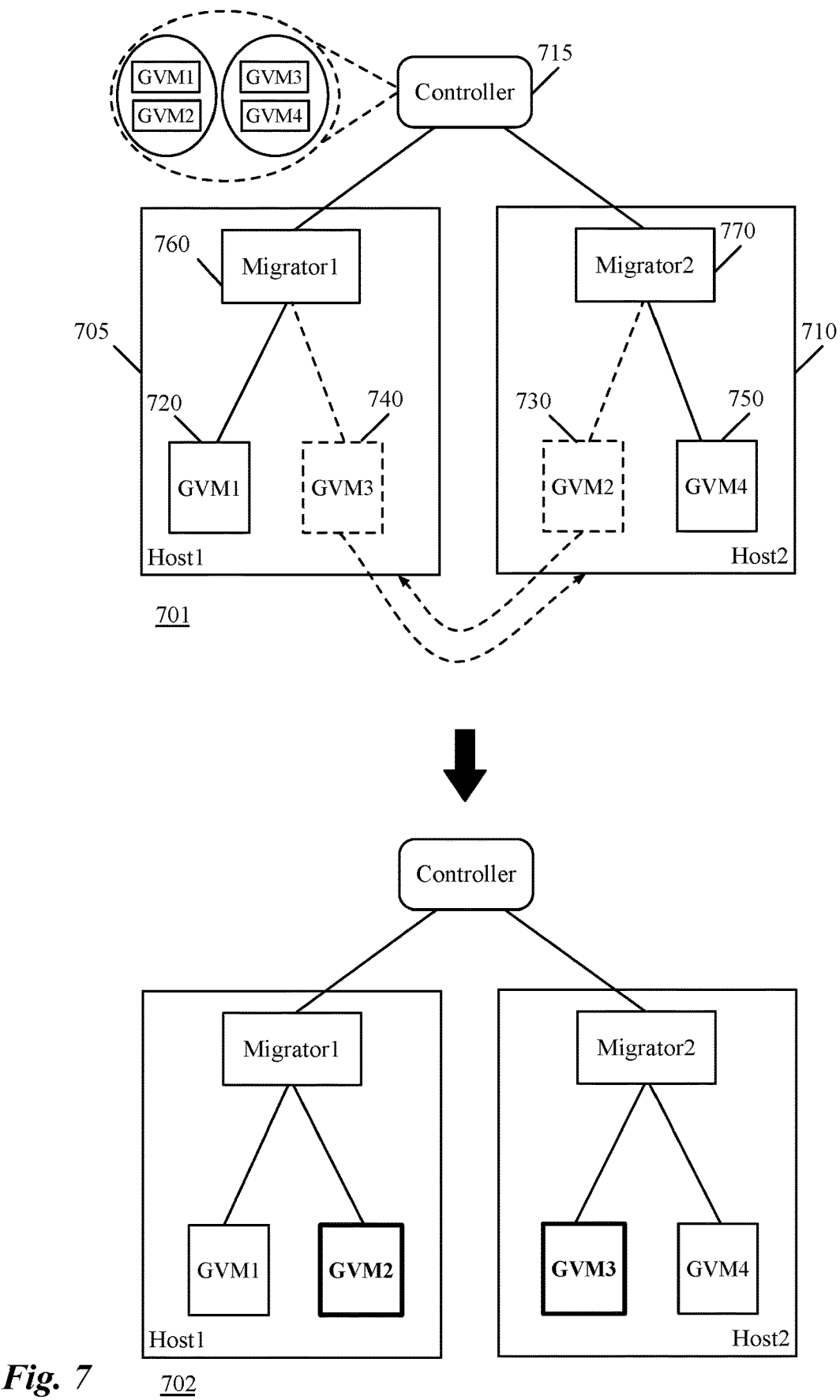
FIG. 7 illustrates a controller directing migrator modules of different host machines to migrate the VMs of host machines to other host machines based on clustering of the VMs.

FIG. 7 illustrates a controller directing migrator modules of different host machines to migrate the VMs of the host machines to other host machines based on the clustering of the VMs. Specifically, this figure shows, through two operational stages 701 and 702, a controller that (i) clusters two pairs of VMs running on two separate host machines based on the number of communications between each pair, and (ii) has the migrator modules of the host machines move each pair of the VMs to operate on one of the host machines. The figure includes two host machines 705 and 710, and a controller 715.

As illustrated in the figure, host machine 705 executes the migrator module 760, while host machine 710 executes the migrator module 770. In some embodiments, each of these VM migrator modules is part of the virtualization application (e.g., hypervisor) of the corresponding host machine. For instance, in some embodiments, a VM migrator module is the vMotion migrator of the ESX hypervisor of VMware Inc. In some embodiments, the VM migrator operates in the kernel space of the hypervisor.

In some embodiments, the VM migrator modules 760 and 770 communicate with each other in order to facilitate and coordinate the live migration of a GVM from one host to another. For example, in some embodiments, each migrator module communicates with a connection state data storage that keeps track of the connection status of the GVMs. In some such embodiments, when a GVM is migrated from a first host machine to a second host machine, the migrator module of the first host machine transfers the connection state entries related to the migrating GVM (from a connection state data storage in the first host machine) to the migrator module of the second host machine, to which the GVM is migrated. The second migrator module then enters the transferred connection state data to a connection state data storage of the second host machine.

At stage 701, GVMs 720 and 740 are instantiated and operating on the host machine 705, while GVMs 730 and 750 are instantiated and operating on the host machine 710. This stage also shows that the controller has grouped guest VMs 720 and 730 in a first cluster and grouped GVMs 740 and 750 in a second cluster. The controller has clustered these GVMs based on the network traffic statistics the controller has received from the service VMs operating on the host machines (not shown in the figure). That is, based on the packet data the SVMs collected and sent to the controller 715, the controller realized that GVMs 720 and 730 communicate with each other more frequently than they communicate with other GVMs.

Similarly, based on the network traffic statistic data, the controller 715 has determined that GVMs 740 and 750 communicate with each other more frequently than they communicate with other GVMs (e.g., GVMs 720 and 730). It is important to note that all of the GVMs 720-750 might have been initially clustered together into one cluster, but because of the host machines' resource limitations or other constraints discussed above, the GVMs are divided into these two different clusters. Conversely, the GVMs 720 and 730 might belong to a first tenant of the hosting system while the GVMs 740 and 750 belong to a different tenant, and as such there is no communication between the GVMs of each cluster with the GVMs of the other cluster. However, because of the illustrated distribution of the GVMs on these two host machines, there is a lot of interhost communications among the GVMs of each tenant, while there is no intrahost communication between the GVMS of each host machine.

The first stage 701 also illustrates that, as a result of the clustering of the GVMs, the controller 715 directs the migrator modules 760 and 770 that operate on the host machines 705 and 710 to migrate the GVMs to the other host machines. The two sets of dashed lines indicate that GVM 740 is being migrated from the host machine 705 to the host machine 710, while the GVM 730 is being migrated from the host machine 710 to the host machine 705.

As discussed above, there can be many different factors for the controller 715 that influence the decision on how to transfer the GVMs across the different host machines. For instance, based on the heavy work load of the host machine 705, the controller might have decided to move the pair of GVMs 720 and 730 to operate on this host machine because these two VMs, at the time of the migration, have a lighter workload and require smaller network bandwidth.

The second stage 702 shows that after the migration, the GVMs 720 and 730 are now operating on the host machine 705, while the GVMs 740 and 750 are operating on the host machine 710 (as the newly migrated GVMs are highlighted in each host machine). As discussed above, the GVMs 720 and 730 might belong to a first tenant of the hosting system, while the GVMs 740 and 750 belong to a different tenant. Therefore, as a result of this migration of the GVMs, the interhost communications between each pair of GVMs has been reduced to zero and all the network communications between each pair of GVMs is now intrahost communication.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
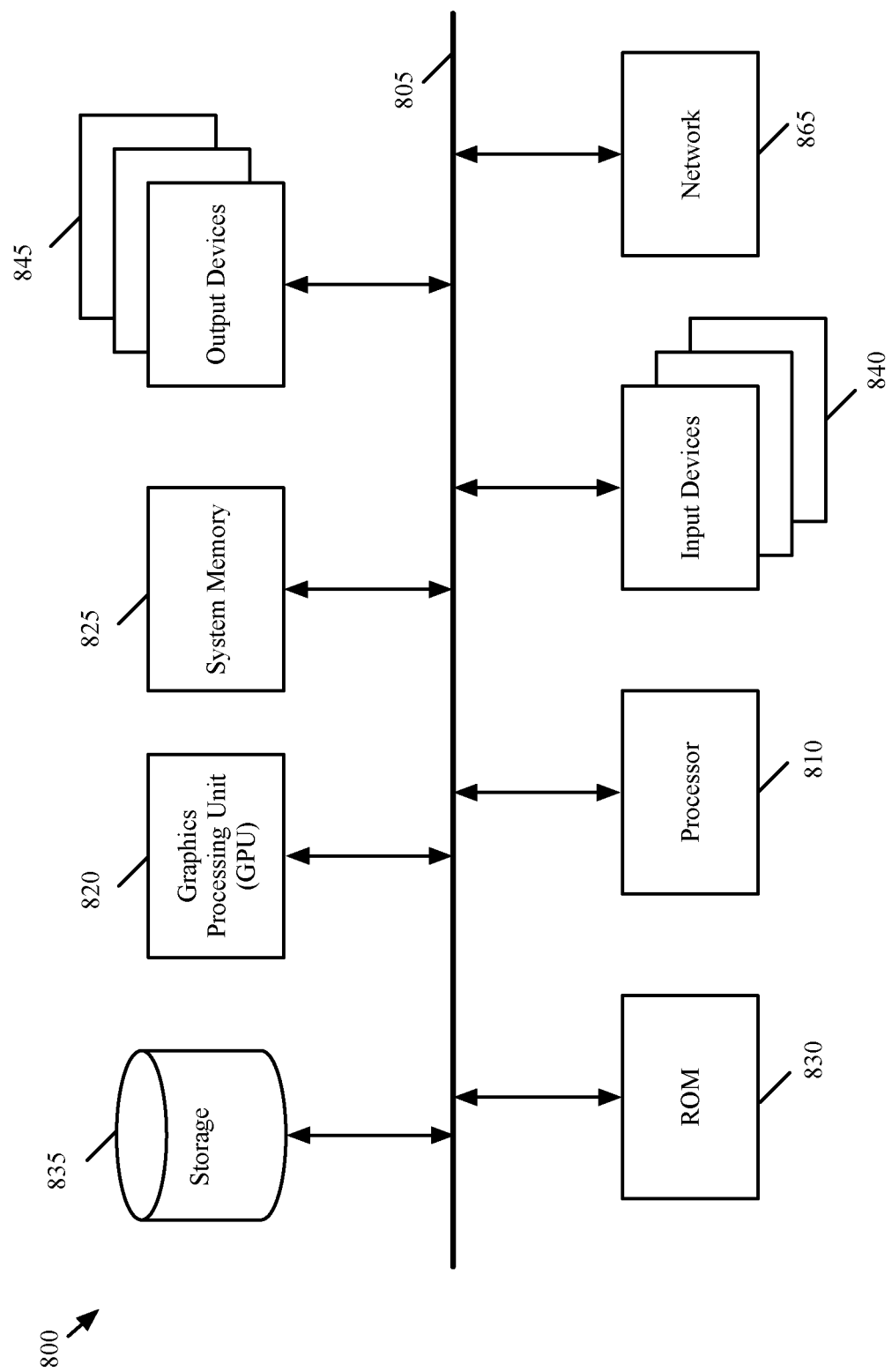
FIG. 8 conceptually illustrates an electronic system with which some embodiments of the invention are implemented.

FIG. 8 conceptually illustrates an electronic system 800 with which some embodiments of the invention are implemented. The electronic system 800 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieves instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash memory device, etc., and its corresponding drive) as the permanent storage device. Like the permanent storage device 835, the system memory 825 is a read-and-write memory device. However, unlike storage device 835, the system memory 825 is a volatile read-and-write memory, such a random access memory. The system memory 825 stores some of the instructions and data that the processor needs at runtime. In some embodiments, the invention's processes are stored in the system memory 825, the permanent storage device 835, and/or the read-only memory 830. From these various memory units, the processing unit(s) 810 retrieves instructions to execute and data to process in order to execute the processes of some embodiments.

The bus 805 also connects to the input and output devices 840 and 845. The input devices 840 enable the user to communicate information and select commands to the electronic system. The input devices 840 include alphanumeric keyboards and pointing devices (also called "cursor control devices"), cameras (e.g., webcams), microphones or similar devices for receiving voice commands, etc. The output devices 845 display images generated by the electronic system or otherwise output data. The output devices 845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

Additionally, the term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. In addition, a number of the figures (including FIGS. 4-6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for clustering frequently communicating machines, the method comprising:

on a particular host computer and outside of a plurality of machines executing on the particular host computer:
identifying a plurality of data messages as the data messages traverse along a set of datapaths to or from the plurality of machines executing on the particular host computer;
at a first module executing on the particular host computer outside of the plurality of machines, collecting statistics regarding the data messages exchanged between each machine in the plurality of machines executing on the particular host computer and other machines executing on other host computers, and storing the collected statistics in a local data storage of the particular host computer; and
at a second module executing on the particular host computer outside of the plurality of machines, retrieving the stored statistics from the local data storage and providing the collected statistics to a controller to determine whether to move any particular machine on the particular host computer or one or more machines executing on other host computers and exchanging data messages with the particular machine to execute on a set of physical proximate host computers.

2. The method of claim 1, wherein the first module is part of a hypervisor executing on the particular host computer and the second module is a service virtual machine (SVM) executing on the particular host computer.

3. The method of claim 1, wherein collecting statistics comprises collecting metadata that identifies sources and destinations of each data message.

4. The method of claim 1, wherein providing the collected statistics comprises providing the collected statistics to the controller in response to a request from the controller.

5. The method of claim 1, wherein providing the collected statistics comprises providing the collected statistics to the controller when the collected statistics exceeds a threshold value.

6. The method of claim 5, wherein the threshold value is a threshold value for the particular machine in the plurality of machines.

7. The method of claim 1, wherein the first module operates in a kernel space of the particular host computer while the second module operates in a user space of the particular host computer.

8. The method of claim 7, wherein the second module is a service virtual machine.

9. The method of claim 1, wherein the particular host computer is one computer for one cluster of machines, while the set of physical proximate host computers includes more than one computer for another cluster of machines.

10. A non-transitory machine readable medium storing a program which when executed by at least one processing unit clusters frequently communicating machines, the program comprising sets of instructions for:
    identifying a plurality of data messages as the data messages traverse along a set of datapaths to or from the plurality of machines executing on the particular host computer;
    at a first module executing on the particular host computer outside of the plurality of machines, collecting statistics regarding the data messages exchanged between each machine in the plurality of machines executing on the particular host computer and other machines executing on other host computers, and storing the collected statistics in a local data storage of the particular host computer; and
    at a second module executing on the particular host computer outside of the plurality of machines, retrieving the stored statistics from the local data storage and providing the collected statistics to a controller to determine whether to move any particular machine on the particular host computer or one or more machines executing on other host computers and exchanging data messages with the particular machine to execute on a set of physical proximate host computers.

11. The non-transitory machine readable medium of claim 10, wherein the first module is part of a hypervisor executing on the particular host computer and the second module is a service virtual machine (SVM) executing on the particular host computer.

12. The non-transitory machine readable medium of claim 10, wherein the set of instructions for collecting statistics comprises a set of instructions for collecting metadata that identifies sources and destinations of each data message.

13. The non-transitory machine readable medium of claim 10, wherein the set of instructions for providing the collected statistics comprises a set of instructions for providing the collected statistics to the controller in response to a request from the controller.

14. The non-transitory machine readable medium of claim 10, wherein the set of instructions for providing the collected statistics comprises a set of instructions for providing the collected statistics to the controller when the collected statistics exceeds a threshold value.

15. The non-transitory machine readable medium of claim 14, wherein the threshold value is a threshold value for the particular machine in the plurality of machines.

16. The non-transitory machine readable medium of claim 10, wherein the first module operates in a kernel space of the particular host computer while the second module operates in a user space of the particular host computer.

17. The non-transitory machine readable medium of claim 16, wherein the second module is a service virtual machine.

18. The non-transitory machine readable medium of claim 10, wherein the particular host computer is one computer for one cluster of machines, while the set of physical proximate host computers includes more than one computer for another cluster of machines.

* * * * *